United States Patent
Mori et al.

(10) Patent No.: US 9,086,611 B2
(45) Date of Patent: Jul. 21, 2015

(54) IMAGE PICKUP APPARATUS THAT CONTROLS OPERATION OF A LENS APPARATUS MOUNTED THEREON, LENS APPARATUS THAT CONTROLS FIRMWARE UPDATE OPERATION AND CONTROL METHODS THEREOF

(75) Inventors: Naomi Mori, Kawasaki (JP); Takeshi Sakaguchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 13/449,774

(22) Filed: Apr. 18, 2012

(65) Prior Publication Data

US 2012/0274836 A1  Nov. 1, 2012

(30) Foreign Application Priority Data

Apr. 28, 2011  (JP) ................................ 2011-102457
Mar. 30, 2012  (JP) ................................ 2012-080013

(51) Int. Cl.
  *H04N 5/225* (2006.01)
  *H04N 5/232* (2006.01)
  *G03B 17/14* (2006.01)
  *H04N 1/00* (2006.01)

(52) U.S. Cl.
  CPC ............ *G03B 17/14* (2013.01); *H04N 1/00962* (2013.01); *H04N 5/23209* (2013.01); *H04N 5/23225* (2013.01)

(58) Field of Classification Search
  CPC .......... H04N 1/00962; H04N 1/00965; H04N 2205/4437
  USPC ........ 348/211.2, 211.3, 211.4, 211.5, 211.14, 348/360, 372; 396/280, 301, 302
  See application file for complete search history.

(56) References Cited

U.S. PATENT DOCUMENTS

| | | | |
|---|---|---|---|
| 6,466,378 B2 * | 10/2002 | Kaneko et al. | 396/76 |
| 7,750,940 B2 * | 7/2010 | Tanaka | 348/207.99 |
| 7,796,350 B2 * | 9/2010 | Yumiki et al. | 396/55 |
| 8,823,868 B2 * | 9/2014 | Tashiro | 348/360 |
| 2002/0154243 A1 | 10/2002 | Fife et al. | |
| 2004/0208475 A1 * | 10/2004 | Ohmura et al. | 386/4 |
| 2005/0057991 A1 * | 3/2005 | Kosugiyama et al. | 365/222 |

(Continued)

FOREIGN PATENT DOCUMENTS

| | | |
|---|---|---|
| CN | 101526908 A | 9/2009 |
| EP | 1768411 A1 | 3/2007 |

(Continued)

OTHER PUBLICATIONS

The above references were cited in a European Search Report issued on Aug. 20, 2012, that issued in the corresponding European Patent Application No. 12165869.4.

(Continued)

*Primary Examiner* — John Villecco
(74) *Attorney, Agent, or Firm* — Cowan, Liebowitz & Latman, P.C.

(57) ABSTRACT

An image pickup apparatus, which is mountable a lens apparatus thereon, obtains information of a mounted lens apparatus and if the lens apparatus is identified as the interchangeable lens which fails in firmware update based on the obtained information, controls to restrict an operation in which an interchangeable lens is used and to enable an operation which does not use the interchangeable lens.

27 Claims, 9 Drawing Sheets

(56) References Cited

U.S. PATENT DOCUMENTS

| | | | |
|---|---|---|---|
| 2006/0075276 A1* | 4/2006 | Kataria et al. | 714/4 |
| 2006/0092312 A1* | 5/2006 | Tanaka | 348/340 |
| 2009/0238553 A1* | 9/2009 | Tamura | 396/296 |
| 2010/0199078 A1* | 8/2010 | Shih et al. | 717/173 |
| 2011/0004871 A1* | 1/2011 | Liu | 717/173 |
| 2011/0019774 A1* | 1/2011 | Furuta | 375/340 |
| 2011/0145804 A1 | 6/2011 | Oka | |
| 2011/0292225 A1* | 12/2011 | Toshiro | 348/207.11 |
| 2012/0212648 A1* | 8/2012 | Oka | 348/231.99 |
| 2013/0028590 A1* | 1/2013 | Hasuda et al. | 396/530 |
| 2014/0009671 A1* | 1/2014 | Ozone et al. | 348/371 |

FOREIGN PATENT DOCUMENTS

| | | | | |
|---|---|---|---|---|
| JP | 2001-147863 A | | 5/2001 | |
| JP | 2003107315 A | * | 4/2003 | |
| JP | 2005084720 A | * | 3/2005 | |
| JP | 2006121418 A | * | 5/2006 | |
| JP | 2009211339 A | * | 9/2009 | |
| JP | 2010-204430 A | | 9/2010 | |
| JP | 2010-246009 | | 10/2010 | |
| JP | 2011-015382 A | | 1/2011 | |
| JP | 2011015382 A | | 1/2011 | |
| JP | 2013054452 A | * | 3/2013 | |
| JP | 2013057866 A | * | 3/2013 | |

OTHER PUBLICATIONS

The above patent documents were cited in a May 6, 2014 Chinese Office Action, which is enclosed with an English Translation, that issued in Chinese Patent Application No. 201210134977.3.

The above foreign patent documents were cited in a Nov. 5, 2014 Chinese Office Action, which is enclosed with an English Translation, that issued in Chinese Patent Application No. 201210134977.3.

* cited by examiner

IMAGE PICKUP APPARATUS THAT CONTROLS OPERATION OF A LENS APPARATUS MOUNTED THEREON, LENS APPARATUS THAT CONTROLS FIRMWARE UPDATE OPERATION AND CONTROL METHODS THEREOF

BACKGROUND OF THE INVENTION

1. Field of the Invention

The present invention relates to an image pickup apparatus such as a digital camera which is interchangeably mountable a lens thereon.

2. Description of the Related Art

Conventionally, as an image pickup apparatus such as a digital camera which is interchangeably mountable a lens thereon, an image pickup apparatus is realized, that performs firmware update (hereinafter, also "firm-up") of the lens with the lens being mounted on the camera, to update the firmware of the lens to the latest version (for example, see Japanese Patent Application Laid-Open No. 2010-246009).

However, the lens firm-up may not be completed due to connection point deviation between the lens and the camera, pick-out of camera battery, drop of battery voltage of the camera, or incompletion of the firm-up file (firmware for update). This may be inconvenient in controlling the lens, such as AF (auto focus) and iris control. Therefore, if an image is taken using a lens for which a process of firm-up is started but the firm-up is not completed, the photographer's intended photographing may not be performed, and this is inconvenient.

SUMMARY OF THE INVENTION

An aspect of the present invention is to provide an image pickup apparatus which is mountable a lens apparatus thereon, the image pickup apparatus including: a lens information obtaining unit that obtains information of a mounted lens apparatus; and a control unit that if the lens apparatus is identified, based on the obtained information, as the interchangeable lens which fails in firmware update, controls to restrict an operation in which an interchangeable lens is used and enable an operation which does not use the interchangeable lens.

Another aspect of the present invention is to provide a lens apparatus mountable on an image pickup apparatus, the lens apparatus including: a memory that holds control firmware; and a control unit that is arranged to perform firmware update of rewriting the firmware or adding firmware on the basis of an instruction from the image pickup apparatus, wherein if the power supply from the image pickup apparatus is cut off before completion of the firmware update, the control unit transmits non-completion information of the firmware update according to next power supply from the image pickup apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An apparatus described below enables predetermined control of a camera apparatus without involving control of a lens apparatus when a process of firm-up of the lens apparatus is not completed. In this case, the predetermined control of the camera apparatus involving the control of the lens apparatus is restricted. This prevents photographing not intended by the photographer.

An example of a case where a control unit of the camera apparatus may determine that the process of the firmware update of the lens apparatus mounted thereon is not completed is a case of execution from a menu, a case in which a lens is mounted, and a case in which an image pickup apparatus is activated, or the like. However, in any case, if it is recognized that an interchangeable lens fails in the firm-up, the lens apparatus is controlled to enable an operation which does not use the interchangeable lens. In these cases, if the firmware update of the lens is attempted and fails to end after attempting the update, an operation of turning off a power supply source is enabled typically.

In any case, if it is determined that the remaining battery capacity is short, or if it is determined that the firm-up file of the mounted lens does not exist, an operation of turning off the power supply source is enabled as typical control of the invention. An example of the operation which does not use the lens is an operation of turning off the power supply source, an operation of firmware update of the lens, an operation of reproduction, communication with the outside, or the like. Which operation is to be enabled can be determined according to specifications of the apparatus.

An embodiment of the present invention will now be described in detail based on the attached drawings.

First Embodiment

Figure 1A:
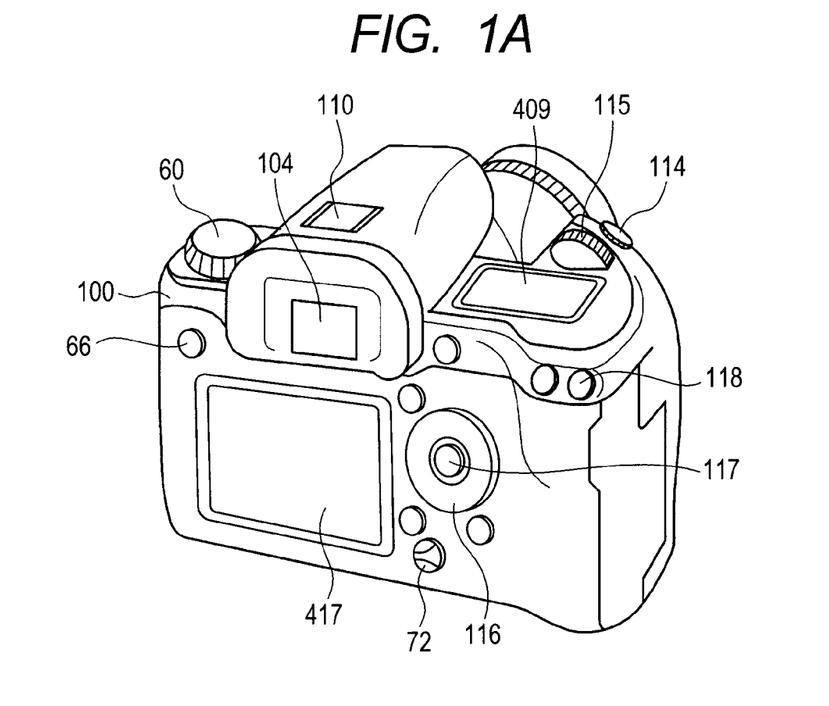
FIGS. 1A and 1B are diagrams illustrating an appearance and an internal configuration of an image pickup apparatus according to an embodiment of the present invention.
Figure 1B:
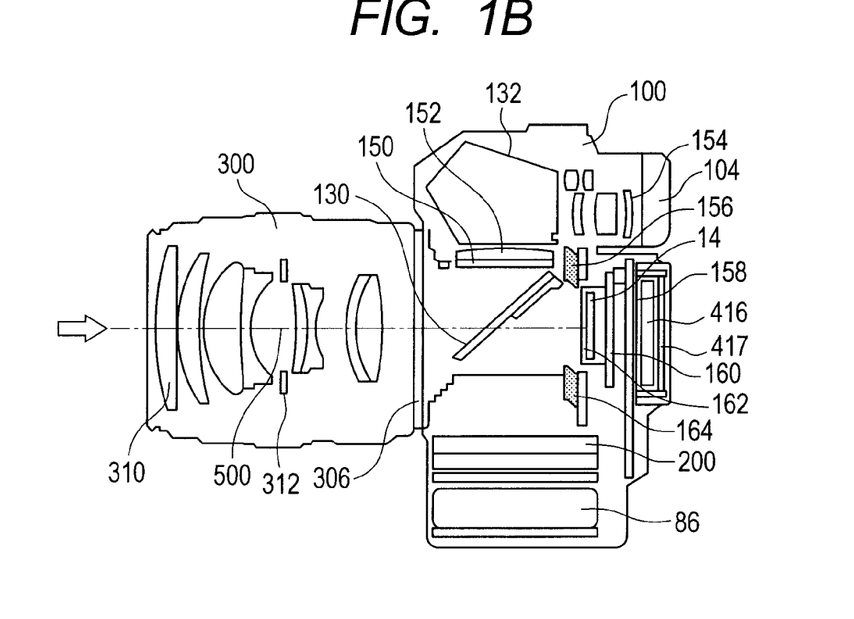

FIGS. 1A and 1B illustrate an image pickup apparatus which is interchangeably mountable a lens apparatus thereon, according to a first embodiment of the present invention. A camera apparatus 100, such as a digital camera, with a lens apparatus 300 being mounted thereon is illustrated here. An accessory shoe 110, an optical viewfinder 104, and a release button 114 are arranged on an upper part of the camera apparatus 100. A main electronic dial 115, a photographing mode dial 60, and an external display unit 409 are also arranged on the upper part of the camera apparatus 100. The release button 114 is used to instruct an image pickup operation. The main electronic dial 115 is directly operated. This allows the operator to switch a shutter speed value and an aperture value. The operation members are operated along with other operation buttons to input numerical values related to camera operations and to switch photographing settings. The external display unit 409 includes a liquid crystal panel and displays photographing conditions, such as the shutter speed value, the aperture value, and the photographing settings, and other information. The photographing mode dial 60 is used to change the photographing mode.

Figure 7:
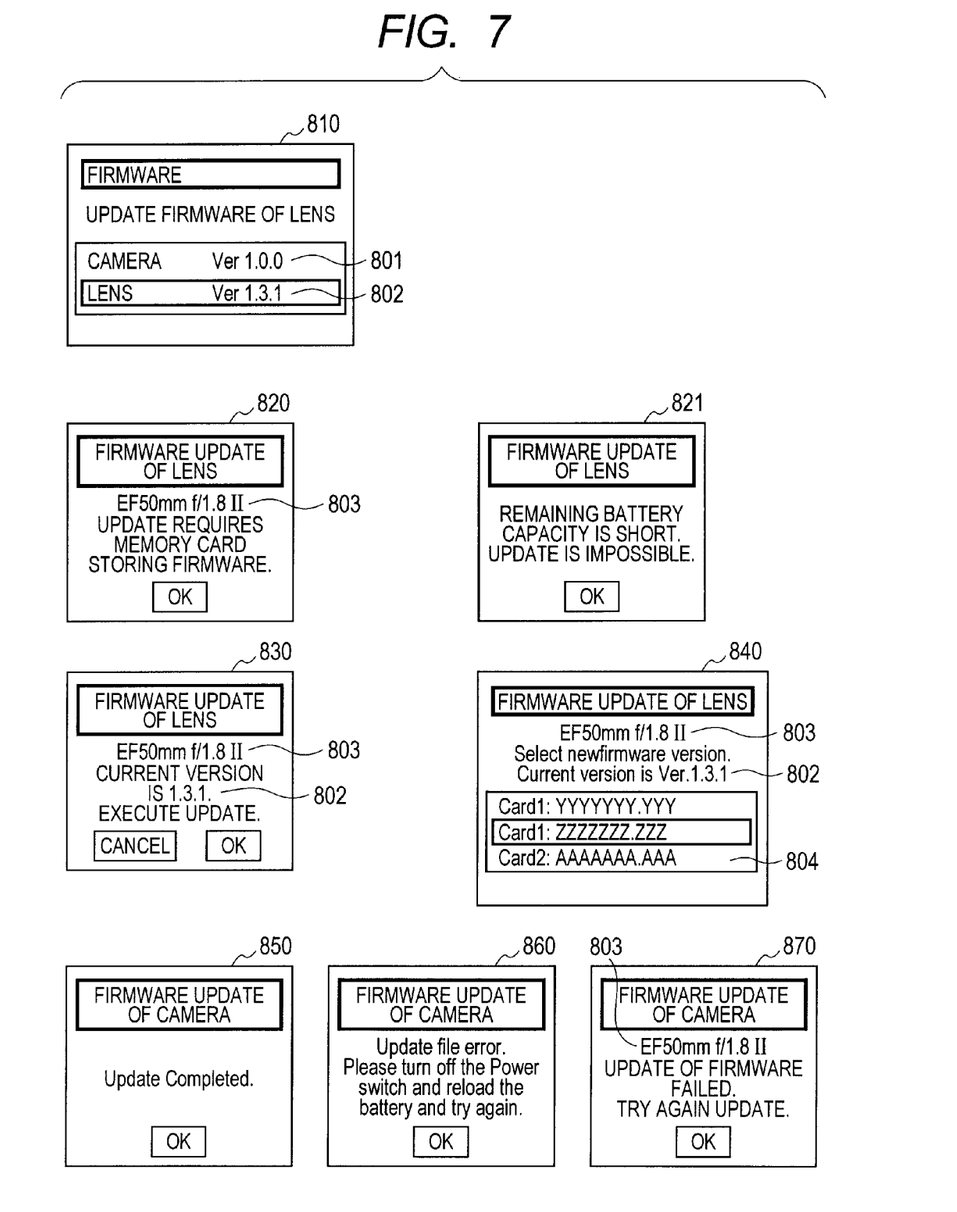
FIG. 7 is a diagram illustrating examples of display of various screens.

An LCD monitor unit 417, a MENU button 66, a sub electronic dial 116, a SET button 117, an AF frame selection button 118, and a power switch 72 are arranged on the back side of the camera main body 100. Although not illustrated, operation members such as a four-way operational key and a multi-controller are also arranged. The LCD monitor unit 417 is used to display images obtained by photographing (image data) and various setting screens. The LCD monitor unit 417 includes a transmissive LCD and has backlight 416 (see FIG. 1B). The LCD monitor unit 417 is also used as a menu screen for various settings that can be set or processed by the image pickup apparatus or for designation of processes and is also used as a display that displays a firm-up screen described later (FIG. 7). The MENU button 66 is operated to instruct a system control circuit 50 (see FIG. 2) to start and terminate the menu display in order to display the menu on the LCD monitor unit 417. The sub electronic dial 116 as well as the main electronic dial 115 are used as follows. The dials are directly operated to switch the shutter speed value and the aperture value, or the dials are operated along with other operation buttons to input numerical values related to the camera operations and to switch the photographing settings. The SET button 117 is used for selection and confirmation in the menu display. The AF frame selection button 118 is used to designate a location to be focused when the lens operates in an AF mode.

A mount 106 (see FIG. 3) is arranged on the front side of the camera apparatus 100, and for example, a mount 306 arranged on the lens apparatus 300 is detachably connected to the mount 106. In FIG. 1B, an axis 500 is an image pickup optical axis. A lens unit 310, which includes a plurality of lenses including a lens having a function of changing the focus position, and an iris 312 are arranged on the illustrated lens apparatus 300. The lens apparatus 300 receives power supply from the camera apparatus 100, communicates with the camera apparatus 100, and controls the lens unit 310 and the iris 312. Inside the camera apparatus 100, a mirror 130 is arranged in an image pickup optical path. The mirror 130 can move between a position for reflecting light of an object from the lens unit 310 toward a viewfinder optical system (position illustrated in FIG. 1B) and a position to which the mirror 130 is withdrawn from the image pickup optical path. The light from the object reflected by the mirror 130 forms an image of an object on a focusing plate 150. There can also be a case without the mirror 130. In FIG. 1B, a condenser lens 152 improves visibility of the viewfinder. A penta prism 132 guides the light from the object passed through the focusing plate 150 and the condenser lens 152 to an eyepiece 154. From the focusing plate 150 to the eyepiece 154 form the optical viewfinder 104. The user can observe the image of the object formed on the focusing plate 150 through the eyepiece 154.

Figure 2:
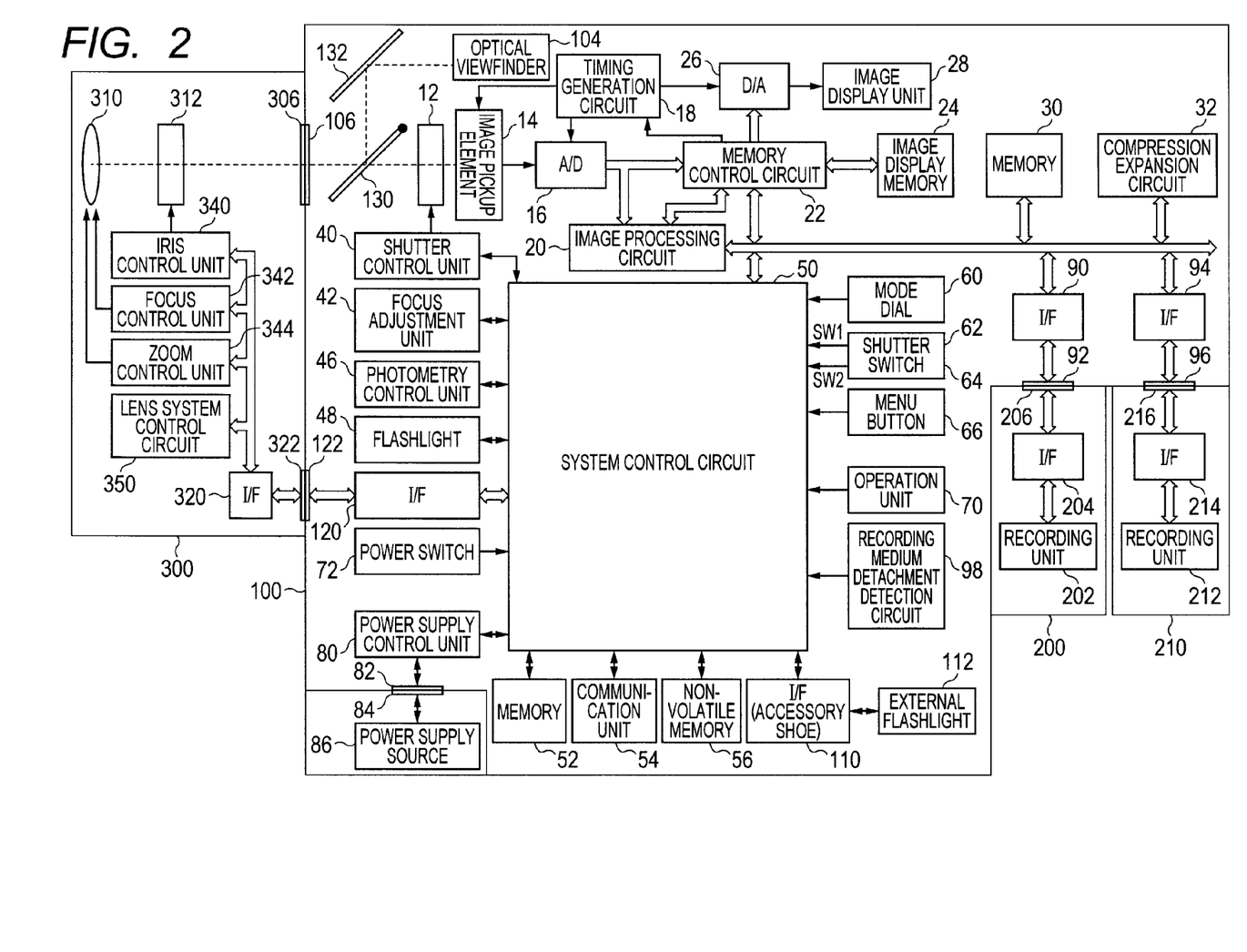
FIG. 2 is a block diagram illustrating a circuit configuration of the image pickup apparatus illustrated in FIGS. 1A and 1B.

In FIG. 1B, a rear diaphragm 156 and a front diaphragm 164 form a focal plane shutter 12 (see FIG. 2). An image pickup element 14 is exposed for a required time by controlling the opening of the rear diaphragm 156 and the front diaphragm 164. There can be a case without the focus plane shutter 12 or a case without the front diaphragm. The image pickup element 14 includes a CCD sensor or a CMOS sensor, and an optical low-pass filter 162 is arranged on the front side of the image pickup element 14. The image pickup element 14 is connected to a printed circuit board 160. A display board 158 is arranged behind the printed circuit board 160. A recording medium 200 records image data obtained by an image pickup operation, and includes a semiconductor memory or a hard disk. The recording medium 200 and a secondary battery 86 are detachable from the camera apparatus 100.

Circuit Configuration

Circuit configurations of the illustrative camera apparatus 100 and the illustrative lens apparatus 300 will be described based on FIG. 2.

In FIG. 2, the constituent elements illustrated in FIGS. 1A and 1B are designated with the same reference numerals as in FIGS. 1A and 1B. The circuit configuration in the lens apparatus 300 will be described first. A connector 322 that electrically connects the lens apparatus 300 to the camera apparatus 100 and an interface 320 are arranged in the lens apparatus 300. The connector 322 and the interface 320 enable communication between a lens system control circuit 350 described later and the system control circuit 50 in the camera apparatus 100 through a connector 122 and an interface 120 arranged on the camera apparatus 100. An iris control unit 340 controls the iris 312. The iris control unit 340 controls the iris 312 in collaboration with a shutter control unit 40 on the basis of photometry information from a photometry control unit 46 described later. A focus control unit 342 controls a focus operation of the lens unit 310. A zoom control unit 344 controls a magnification changing operation of the lens unit 310. The lens system control circuit 350 comprehensively controls various operations of the lens apparatus 300. The control circuit 350 includes a memory that stores constants and variables for various operations as well as firmware such as computer programs. The programs are updated in lens firm-up. The update of the programs denotes rewriting or addition of firmware. If the firmware update of the lens apparatus 300 fails, the information of the lens system control circuit 350 becomes inaccurate, and the lens control becomes difficult.

The circuit configuration in the camera apparatus 100 will be described. The light from the object passed through the lens unit 310 and the iris 312 passes through the opened focal plane shutter 12, while the mirror 130 is withdrawn outside of the image pickup optical path (the mirror 130 is disposed in the image pickup optical path if the mirror 130 is a half mirror). The light enters the image pickup element 14. The image pickup element 14 photoelectrically converts the entered light from the object and outputs an analog image signal. An A/D converter 16 converts the analog signal (image signal) output from the image pickup element 14 to a digital signal. Under the control of a memory control circuit 22 and the system control circuit 50, a timing generation circuit 18 supplies a clock signal and a control signal to the image pickup element 14, the A/D converter 16, and a D/A converter 26. An image processing circuit 20 applies a pixel interpolation process and a color conversion process to image data from the A/D converter 16 or to image data from the memory control circuit 22. The image processing circuit 20 also uses the image data output from the A/D converter 16 to execute a predetermined calculation process. Based on the calculation result, the system control circuit 50 executes an auto focus (AF) process, an auto exposure (AE) process, and a pre-flash light emitting (flash exposure) process of a TTL system for controlling the shutter control unit 40 and a focus adjustment unit 42.

The image processing circuit 20 further uses the image data output from the A/D converter 16 to execute a predetermined calculation process and executes an auto white balance (AWB) process of a TTL system on the basis of the calculation result. The memory control circuit 22 controls the A/D converter 16, the timing generation circuit 18, the image processing circuit 20, an image display memory 24, the D/A converter 26, a memory 30, and a compression/expansion circuit 32. The image data output from the A/D converter 16 is written in the image display memory 24 or the memory 30 through the image processing circuit 20 and the memory control circuit 22 or through only the memory control circuit 22. An image display unit sequentially displays, on the LCD monitor unit 417 illustrated in FIGS. 1A and 1B, the image signal converted to the analog signal by the D/A converter 26 and written in the image display memory 24 to realize an electronic viewfinder (EVF) function. The image display unit 28 turns on/off the electronic viewfinder (EVF) function based on an instruction of the system control circuit 50.

The memory 30 stores still images in relation to imaging. The memory 30 is also used as a frame buffer of images continuously written in the recording medium 200 and in an attachment apparatus 210 at a predetermined rate during photographing a moving image. The memory 30 is further used as a work area of the system control circuit 50. The compression/expansion circuit 32 uses a known image compression method to compress/expand the image data. The compression/expansion circuit 32 reads the images stored in the memory 30 to execute a compression process or an expansion process and writes the processed data again in the memory 30.

Based on photometry information from the photometry control unit 46, the shutter control unit 40 controls the shutter speed of the focal plane shutter 12 in collaboration with the iris control unit 340. The focus adjustment unit 42 executes an AF process by detecting a phase difference of the image of the object transmitted through the mirror 130 and guided by a sub-mirror not illustrated. The photometry control unit 46 executes an AE (auto exposure) process based on an output signal from a photometry sensor not illustrated. Flash light 48 has a light emitting function of AF fill light and a flash light modulation function. The photometry control unit 46 executes a flash exposure (flash light modulation) process in collaboration with the flash light 48.

The system control circuit 50 as a control unit includes a CPU and a memory and comprehensively controls the operation of the camera apparatus 100. A memory 52 stores constants, variables, and computer programs (basic programs) for operation of the system control circuit 50. According to the execution of the computer programs by the system control circuit 50, a communication unit 54 displays characters and images through an LCD or an LED and generates sound from a speaker (not illustrated) to notify, to the outside, operation conditions of the camera and messages. The communication unit 54 includes an LCD unit that displays, in the optical viewfinder 104, the aperture value, the shutter speed, a degree of focusing, a vibration warning, and an exposure correction value. A non-volatile memory 56 includes, for example, an EEPROM capable of electrical deletion and recording and is used as a storage memory of computer programs. In this case, the computer programs are stored in the non-volatile memory 56 in a computer-readable form. The computer programs include computer-executable application programs in relation to flow charts of FIGS. 3 to 6 described later. The non-volatile memory 56 also stores setting values set on a GUI screen such as a menu screen, setting values set by the operation of the main electronic dial 115 and the sub electronic dial 116, and photographing mode information designated by the operation of the photographing mode dial 60.

A shutter switch (SW1) 62 is turned on by a first stroke operation (half-depression) of the release button 114 and instructs the system control circuit 50 to start operations of an AF process, an AE process, an AWB process, and an EF process. A shutter switch (SW2) 64 is turned on by a second stroke operation (full-depression) of the release button 114 and instructs the system control circuit to start operations of a series of image pickup processes including an exposure process, a development process, and a recording process. An operation unit 70 includes various buttons, such as the MENU button 66, the SET button 117, and the AF frame selection button 118, and various dials, such as the main electronic dial 115, the sub electronic dial 116, and the photographing mode dial 60. The system control circuit 50 performs various operations according to signals from the operation unit 70. The power switch 72 is a switch for switching on/off the power supply source of the camera apparatus 100. At the same time, operations of the power switch 72 can also switch on/off the power supply source of the lens apparatus 300, external flash light 112, the recording medium 200, and the other attachment apparatus (such as a personal computer) 210 connected to the camera apparatus 100.

A power supply control unit 80 includes a battery detection circuit, a DC-DC converter, and a switch circuit that switches a block to be energized. The power supply control unit 80 detects whether the battery is mounted and detects the type of the battery as well as the remaining battery capacity. Based on the detection result and an instruction of the system control circuit 50, the power supply control unit 80 controls the DC-DC converter and supplies a required voltage to the components including the recording medium 200 for a required period. Connectors 82 and 84 supply power from the power supply source 86, such as a battery, to the camera apparatus 100, the lens apparatus 300, the external flash light 112, the recording medium 200, and the other attachment apparatus 210. Interfaces 90 and 94 are interfaces of the recording medium 200 and the attachment apparatus 210 respectively, and connectors 92 and 96 connect to the recording medium 200 and the attachment apparatus 210 respectively. A recording medium detachment detection circuit 98 detects whether the recording medium 200 and the attachment apparatus 210 are attached to the connectors 92 and 96. The recording medium 200 includes a connector 206, an interface 204, and a recording unit 202. The attachment apparatus 210 includes a connector 216, an interface 214, and a recording unit 212.

Summary of Process of Firmware Update

Figure 3:
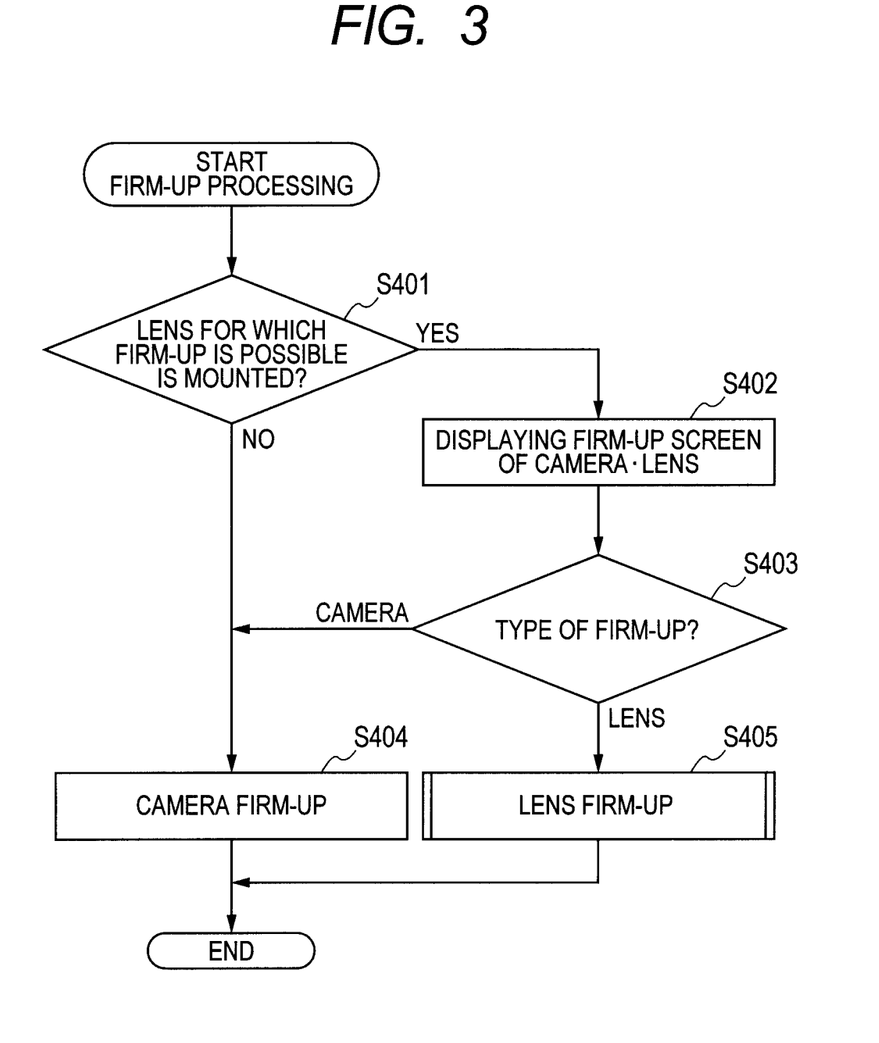
FIG. 3 is a flow chart illustrating firm-up executed by a user from a menu.

A summary of a process of firmware update executed by the user from the menu in the camera with the configuration described above will be described based on a flow chart of FIG. 3. In the flow charts of FIG. 3, etc., the numbers provided with an alphabet "S" in front, such as S401, indicate step numbers of the processes. Details of the process of S405 of FIG. 3 will be described later based on a flow chart of FIG. 4.

When the user instructs display of a firm-up menu, the system control circuit 50 discriminates whether firm-up for the attached lens is possible, on the basis of the data transmitted from the lens system control circuit 350 (S401). The system control circuit 50 discriminates that the firm-up for the lens apparatus 300 is possible if firm-up availability information set in the lens apparatus 300 indicates "available", and otherwise, discriminates that the firm-up for the lens is not possible. As a result, the process proceeds to step S402 if the information of the lens apparatus and the information of the camera apparatus match so that the firm-up is possible. If not, the system control circuit 50 executes camera firm-up processing (S404) and terminates the process. If it is determined in S401 that the firm-up for the attached lens is possible, the system control circuit 50 displays a firm-up screen 810 of the camera/lens of FIG. 7 (S402). The system control circuit 50 discriminates the target of the firm-up selected by the user in the firm-up screen 810 of the camera/lens of FIG. 7 (S403). If the result indicates the lens, the system control circuit 50 executes firm-up processing of the lens apparatus (S405) and terminates the process. In FIG. 7, a screen 801 is an example of display of the version of the camera, and a screen 802 is an example of display of the version of the lens. Meanwhile, if the result of the discrimination for the firm-up indicates the camera, the system control circuit 50 executes camera firm-up processing (S404) and terminates the process.

Process of Firmware Update

Details of the firm-up processing of the lens apparatus 300 in S405 of FIG. 3 will be described based on the flow chart of FIG. 4. The firm-up processing is for rewriting the firmware of the lens apparatus 300 or for adding firmware. The user executes the firm-up processing of the lens apparatus 300 from the menu in the firm-up processing of the lens apparatus 300. The system control circuit 50 first checks the power supply source 86 to verify whether there is a remaining battery capacity sufficient for the firm-up processing of the lens apparatus (S501). If the verification is affirmative (there is the remaining battery capacity), the process proceeds to step S502. If the verification is not affirmative, the system control circuit 50 performs a remaining battery capacity shortage warning display 821 of FIG. 7 on the LCD monitor unit 417 (S503) and terminates the process. For example, the system control circuit 50 controls to perform only an operation of turning off the power supply source. In this way, for example, the control unit controls to enable only the operation of turning off the power supply source of the image pickup apparatus when the control unit determines that the remaining battery capacity is short in the present embodiment. If the remaining battery capacity is sufficient in step S501, the system control circuit 50 discriminates whether the recording unit 202 of the recording medium 200 or the recording unit 212 of the other attachment apparatus 210 includes a firm-up file for the mounted lens apparatus (S502). As a result, if the firm-up file for the mounted lens apparatus exists, the system control circuit 50 displays a firm-up confirmation screen 830 of the lens apparatus of FIG. 7 on the LCD monitor unit 417 (S504). In FIG. 7, a screen 803 is an example of display of the name of the mounted lens.

Meanwhile, if the firm-up file for the mounted lens apparatus does not exist, the system control circuit 50 performs a no firm-up file warning display 820 of FIG. 7 on the LCD monitor unit 417 (S514) and terminates the process. For example, the system control circuit 50 restricts predetermined control of the camera apparatus 100 involving the control of the lens apparatus 300 and controls to perform an operation of turning off the power supply source of the camera apparatus 100. In this way, the control unit restricts the predetermined control of the camera apparatus involving the control of the lens apparatus 300 when the control unit determines that the recording medium 200 and the attachment apparatus 210 do not include the firm-up file of the mounted lens. The control is restricted while the operation of turning off the power supply source of the image pickup apparatus is enabled. The system control circuit 50 discriminates whether the firm-up is permitted by the user operation on the firm-up confirmation screen 830 of the lens apparatus of FIG. 7 displayed in step S504 (S505). As a result, if the firm-up is not permitted, the process is terminated. On the other hand, if the firm-up is permitted, the system control circuit 50 displays all firm-up files for the mounted lens apparatus on a firm-up file list screen 840 of the lens apparatus of FIG. 7 (S506). The system control circuit 50 sets a failure condition in firm-up failure information of the lens system control circuit 350 (S507). This is because the failure condition may not be able to be set if the failure condition is designed to be set when the firm-up is failed. The system control circuit 50 uses the firm-up file selected by the user operation on the list screen 840 of FIG. 7 and executes the firm-up of the lens apparatus (S508). In FIG. 7, a screen 804 is an example of display of the firm-up file list for the mounted lens apparatus.

The system control circuit 50 discriminates the lens firm-up result (S509). If the lens firm-up is succeeded, the system control circuit 50 displays a firm-up success screen 850 of FIG. 7 on the LCD monitor unit 417 (S510). The system control circuit 50 also clears the firm-up failure information of the lens system control circuit 350 set in step S507 (S512) and terminates the process. On the other hand, if the lens firm-up is failed, the system control circuit 50 displays a firm-up failure screen 860 of FIG. 7 on the LCD monitor unit 417 (S511). At this point, the system control circuit 50 restricts the predetermined control of the camera apparatus 100 involving the control of the lens apparatus 300 and sets an error condition (condition in which only the operation of the power switch 72 is accepted) to the camera (S513) to terminate the process. The firm-up failure information of the lens system control circuit 350 set in step S507 is maintained. In this way, if the firmware update of the mounted lens is terminated by a failure in the present embodiment, the control unit restricts the predetermined control of the camera apparatus 100 involving the control of the lens apparatus 300 and controls to enable the operation of turning off the power supply source of the image pickup apparatus.

Lens Warning Processing when Camera is Activated

Lens warning processing when the camera is activated will be described based on a flow chart of FIG. 5. In the lens warning processing when the camera is activated, a process for a case where the lens apparatus, which fails in the firm-up, is being mounted at a time of the activation of the camera is executed. The system control circuit 50 first obtains lens information from the lens system control circuit 350 (S601) and discriminates whether the lens apparatus which fails in the firm-up is mounted on the basis of information in the lens information indicating that the firm-up is not completed after the start of the firm-up processing (S602). The process is terminated if the lens is not being mounted or if the lens apparatus which does not fail in the firm-up is being mounted.

Meanwhile, if the lens apparatus that is not completed with the lens firm-up is being mounted, the system control circuit 50 displays the warning screen 860 of FIG. 7 that is displayed when the lens apparatus which fails in the firm-up is mounted (S603). The warning screen indicates a warning that the firm-up processing has failed, and prompts turning off the power supply source and turning on the power supply source again after checking the battery.

The system control circuit 50 checks the power supply source 86 and verifies whether there is a remaining battery capacity sufficient for the firm-up processing of the lens apparatus (S604). If the verification is affirmative, the process proceeds to step S605. If the verification is not affirmative, the system control circuit 50 performs the remaining battery capacity shortage warning display 821 of FIG. 7 on the LCD monitor unit 417 (S606) and terminates the process. If the remaining battery capacity is sufficient in step S604, the system control circuit 50 discriminates whether the recording unit 202 of the recording medium 200 or the recording unit 212 of the other attachment apparatus 210 includes a firm-up file for the mounted lens apparatus (S605). As a result, the process proceeds to step S607 if the firm-up file for the mounted lens apparatus exists. If the firm-up file for the mounted lens apparatus does not exist, the system control circuit 50 displays, on the LCD monitor unit 417, the warning display 821 of FIG. 7 indicating that the firm-up file does not exist (S614) and terminates the process.

If the firm-up file for the mounted lens apparatus exists in step S605, the system control circuit displays all firm-up files for the mounted lens apparatus on the firm-up file list screen 840 of the lens apparatus of FIG. 7 (S607). The system control circuit 50 uses the firm-up file selected by the user operation on the list screen 840 of FIG. 7 to execute the firm-up of the lens apparatus (S608). The system control circuit 50 discriminates the firm-up result of the lens apparatus (S609). If the firm-up is succeeded, the system control circuit 50 displays the firm-up success screen 850 of FIG. 7 on the LCD monitor unit 417 (S610). The system control circuit 50 also clears the firm-up failure information of the lens system control circuit 350 (S612) and terminates the process.

On the other hand, if the firm-up is failed, the system control circuit 50 displays the firm-up failure screen 860 of FIG. 7 on the LCD monitor unit 417 (S611) and sets the error condition (condition in which only the operation of the power switch 72 is accepted) to the camera (S613) to terminate the process. The firm-up failure information of the lens system control circuit 350 is maintained. In this way, according to the present embodiment, the control unit controls to enable only the operation of the firmware update of the lens apparatus at a time of the activation, if the control unit determines that the firmware update is failed in the lens apparatus on the basis of the information of the mounted lens apparatus.

Lens Attach-Time Processing

Lens attach-time processing will be described based on a flow chart of FIG. 6. In the lens apparatus attach-time processing, a process when the lens apparatus is mounted after the termination of the activation process of the camera is executed. The system control circuit 50 first obtains the lens apparatus information from the lens system control circuit 350 (S701). Consequently, the system control circuit 50 discriminates whether the lens apparatus which fails in the firm-up is being mounted, on the basis of the firm-up failure information that is information in the lens apparatus information indicating that the firm-up is not completed (S702). If the lens apparatus is not being mounted, or if a lens which does not fail in the firm-up processing is being mounted, the process is terminated. On the other hand, if a lens which fails in the firm-up processing is mounted, the system control circuit 50 sets the error condition (condition in which only the operation of the power switch 72 is accepted) to the camera (S703) to terminate the process.

Figure 4:
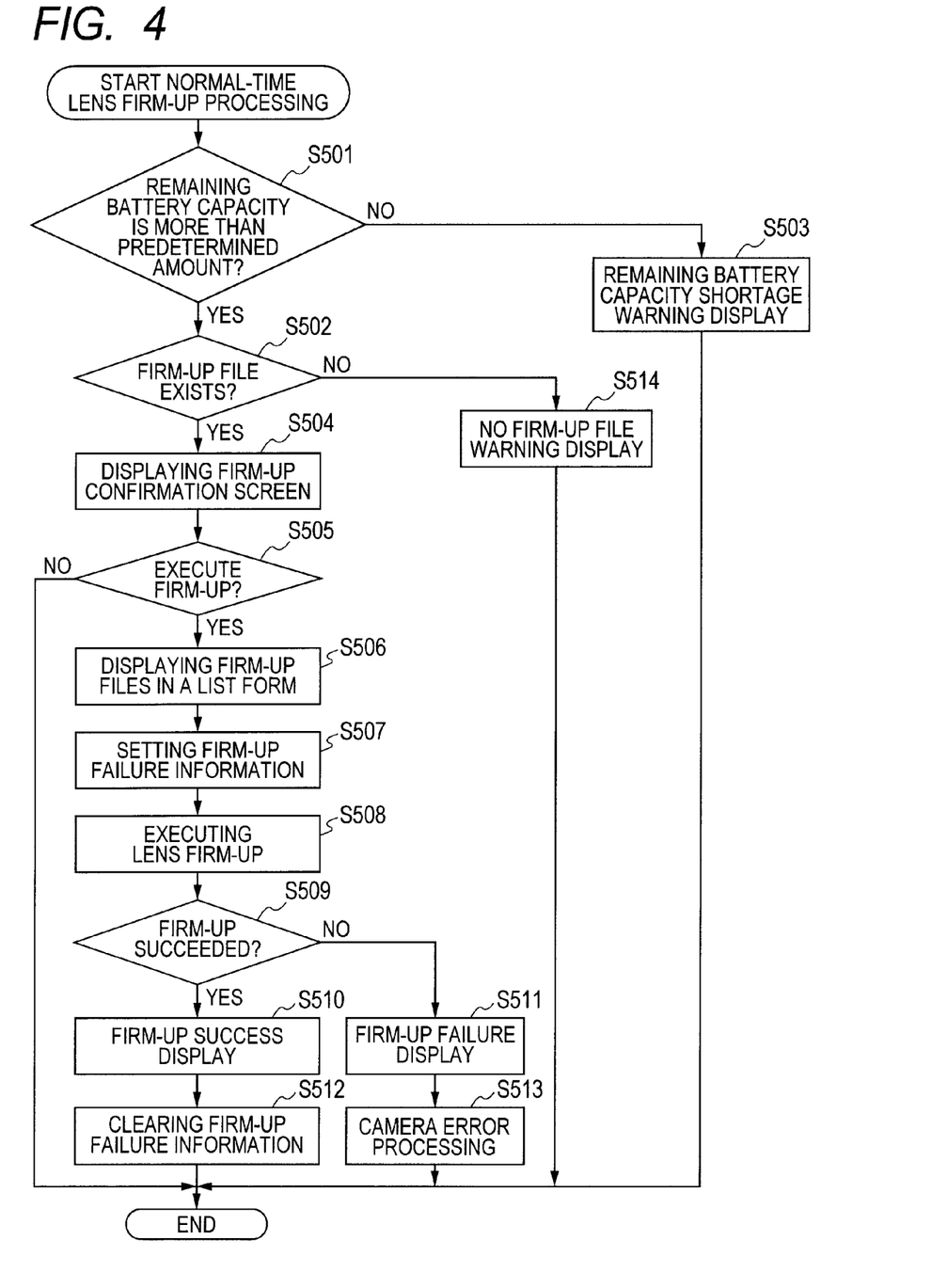
FIG. 4 is a flow chart illustrating lens firm-up processing in S405 of FIG. 3.
Figure 5:
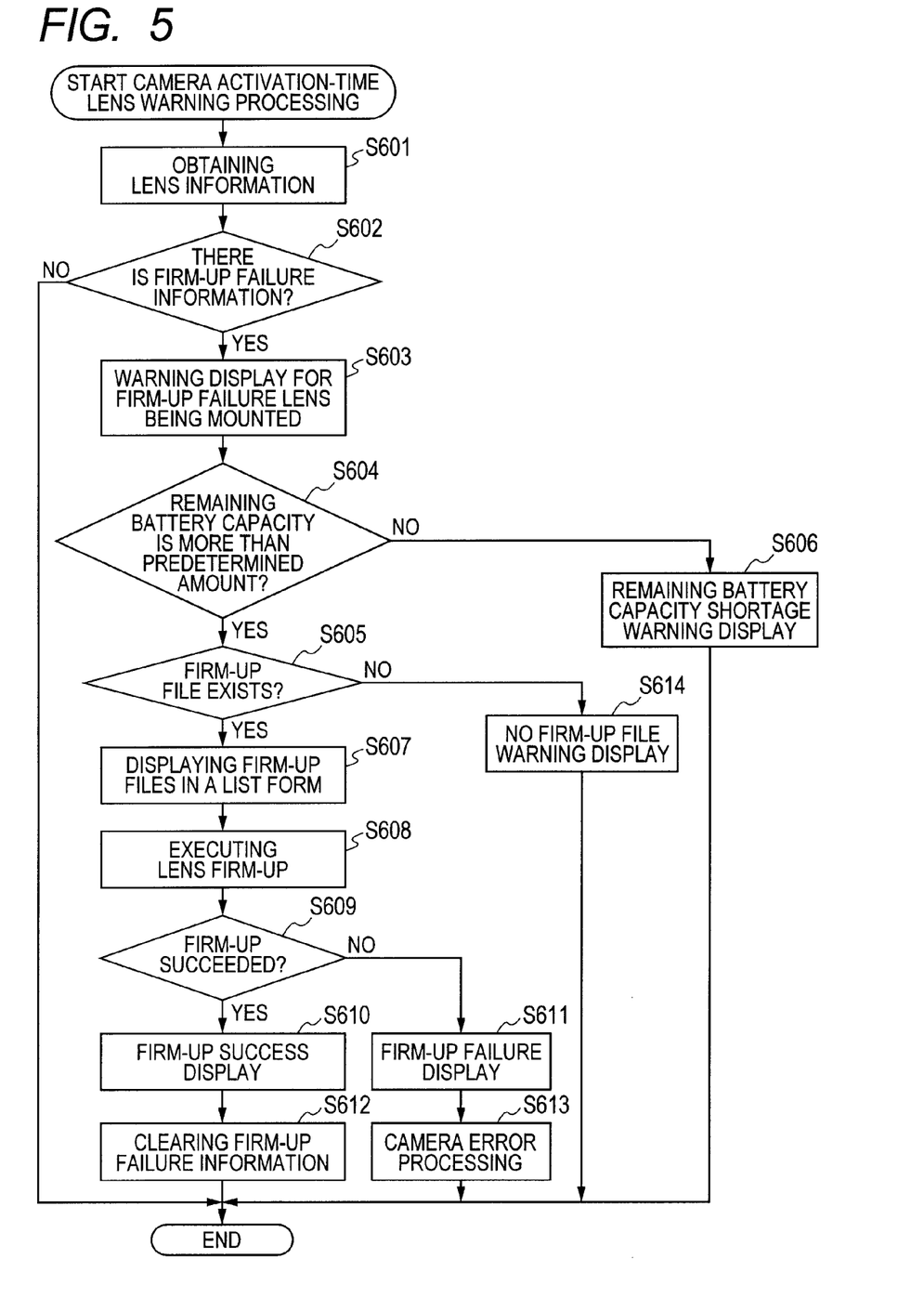
FIG. 5 is a flow chart illustrating details of camera activation-time lens warning processing.
Figure 6:
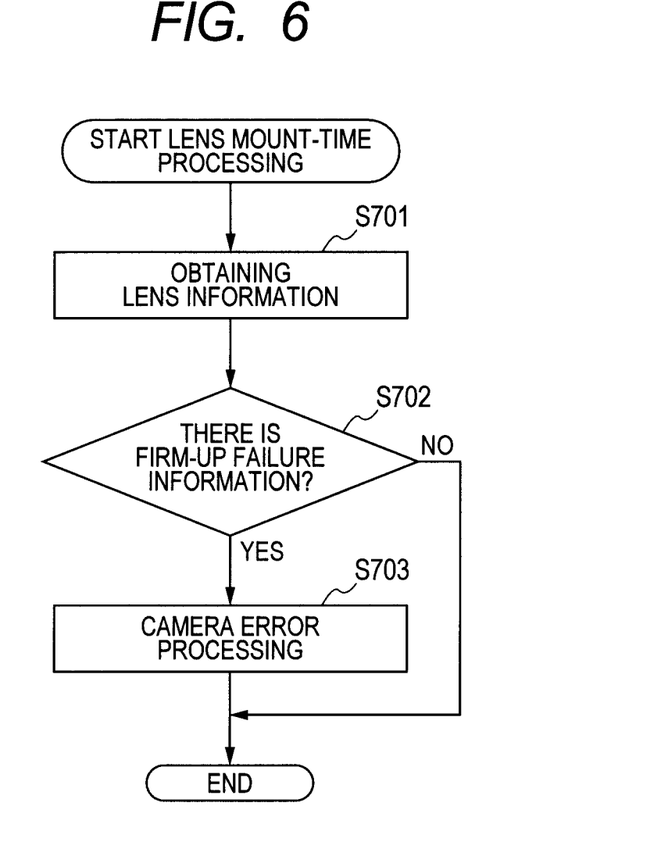
FIG. 6 is a flow chart illustrating details of lens attach-time processing.

In the above-described embodiment, the error condition is set to the camera in step S513 of FIG. 4, step S614 of FIG. 5, and step S703 of FIG. 6 after the failure of the lens firm-up, and the predetermined control of the camera apparatus involving the control of the lens apparatus is restricted. In this case, the operation of the power switch 72 is enabled. Once the user turns off the power switch 72 and turns on the power switch 72 again, the camera is activated. Then, the camera activation-time lens apparatus warning processing of FIG. 5 is executed, and the firm-up screen of the lens apparatus is displayed.

Process of Firmware-Up of Lens Apparatus 300

Figure 8:
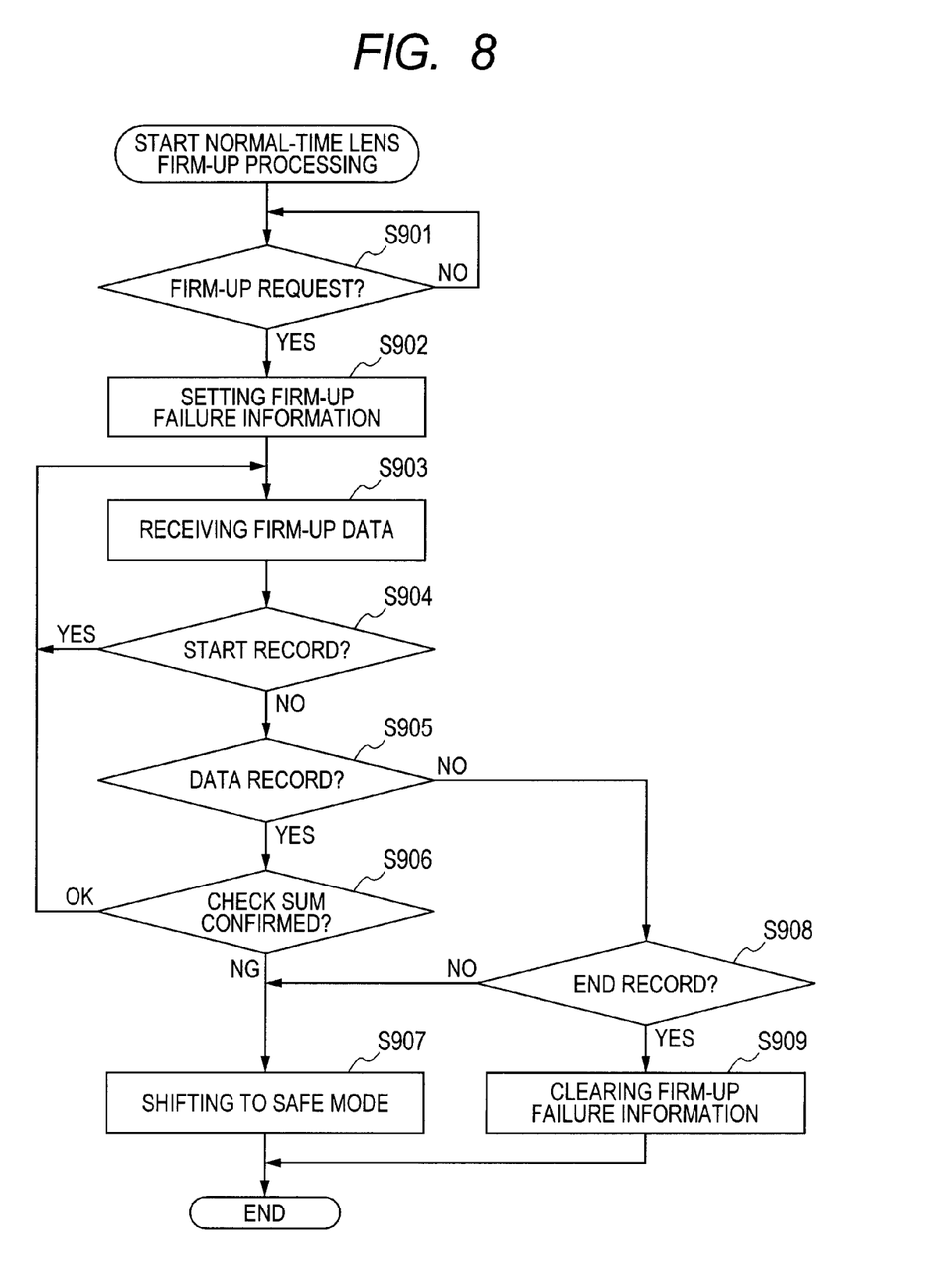
FIG. 8 is a diagram illustrating a processing flow chart in a lens apparatus.

Details of a lens firm-up processing of the lens apparatus 300 will be described based on a flow chart of FIG. 8. The processing is for rewriting the firmware of the lens apparatus 300 or for adding firmware. In the firm-up processing of the lens apparatus, the lens system control circuit 350 verifies reception of a firm-up request through communication from the system control circuit 50 (S901). If the reception is confirmed, the lens system control circuit 350 proceeds to a process of step S902. On the other hand, if the reception is not confirmed, the lens system control circuit 350 waits for the reception of the firm-up request in step S901 again. The lens system control circuit 350 then sets the failure condition to the firm-up failure information (S902).

The lens system control circuit 350 receives, line by line, the data of the firm-up file selected by the user operation on the list screen 840 of FIG. 7 (S903). The format of the firm-up file can be an S format or a HEX format generally used as firmware. However, the realization of the functions of the embodiment does not depend on the format of the firm-up file. The format of the firm-up file is the S format in the description of FIG. 8.

In step S903, the lens system control circuit 350 determines whether the received data indicates a start record (S904). If the data indicates the start record, the lens system control circuit 350 proceeds to a process of step S903 and receives data of the next line. On the other hand, if the data does not indicate the start record, the lens system control circuit 350 determines whether the data indicates a data record (S905). The lens system control circuit 350 proceeds to step S906 if the data indicates the data record and proceeds to step S908 if the data does not indicate the data record.

In step S906, the lens system control circuit 350 compares a check sum of the received data record with a check sum obtained from data values from the byte count to the check sum. If the check sums match, the lens system control circuit 350 proceeds to step S903 and receives data of the next line. On the other hand, the lens system control circuit 350 proceeds to S907 if the check sums do not match. The lens apparatus 300 shifts to a safe mode, and the firm-up processing is terminated abnormally.

In step S908, the lens system control circuit 350 determines whether the received data indicates an end record and proceeds to step S909 if the data indicates the end record. The lens system control circuit 350 clears the failure condition of the firm-up failure information set in step S902, and the firm-up processing is terminated normally.

Figure 9:
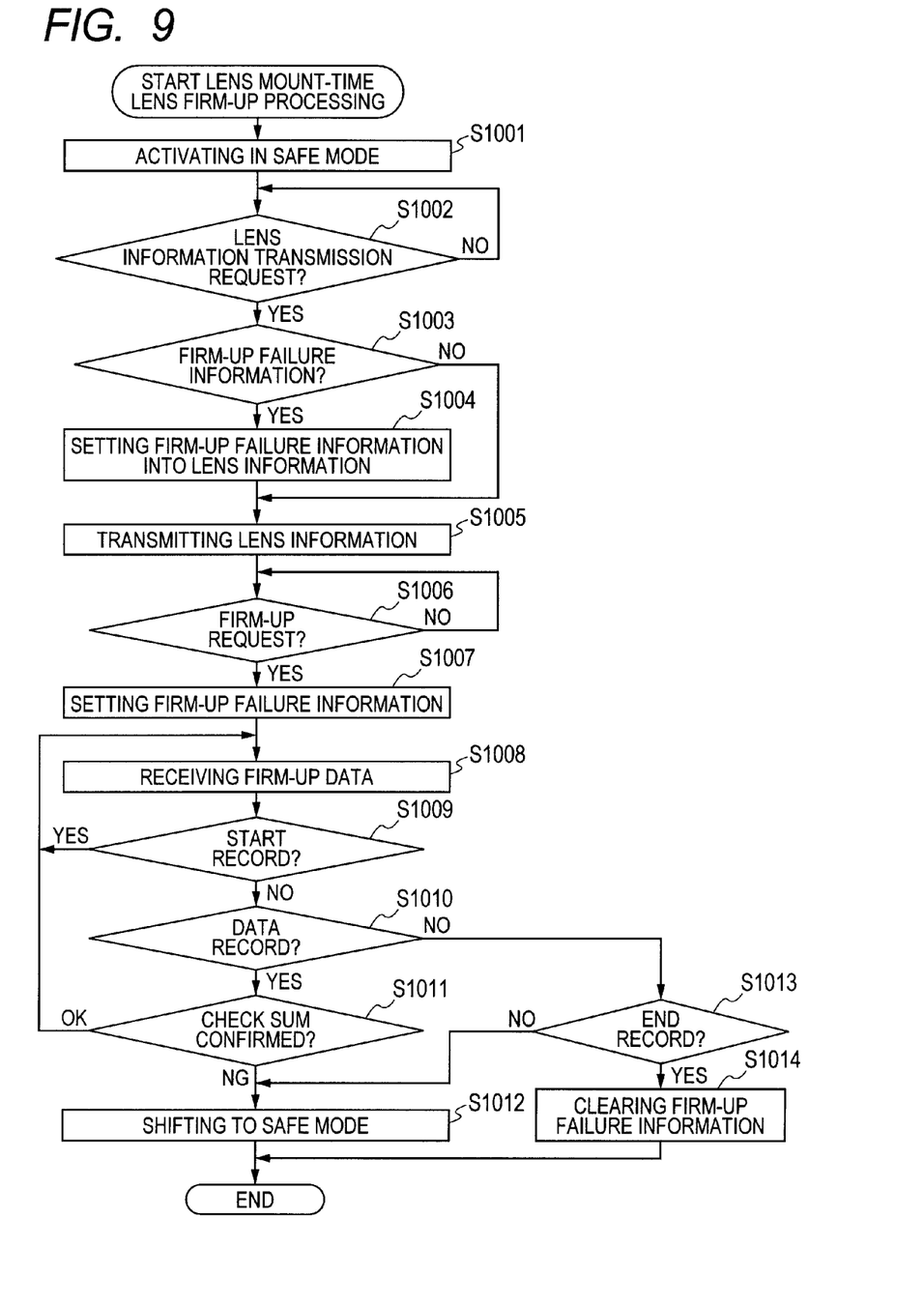
FIG. 9 is a diagram illustrating a flow chart of lens firm-up processing executed when the process of the firm-up is abnormally terminated in the process of the flow chart of FIG. 8.

Firm-Up Processing of Lens Apparatus 300 after Firm-Up Processing is Terminated Abnormally Details of lens firm-up processing of the lens apparatus 300 after the abnormal termination of the firm-up processing will be described based on a flow chart of FIG. 9. The processing is executed when the power supply from the camera main body 100 to the lens apparatus 300 is cut off for some reason during the process of the firmware update of the last time, and the firm-up failure information is set.

The lens system control circuit 350 is activated in the safe mode (S1001). The lens system control circuit 350 verifies reception of a lens information transmission request through communication from the system control circuit 50 (S1002). If the request is received, the lens system control circuit 350 proceeds to a process of step S1003. On the other hand, if the request is not received, the lens system control circuit 350 waits for the reception of the lens information transmission request in step S1002 again. The lens system control circuit 350 then verifies the firm-up failure information (S1003). If the failure condition is set, the lens system control circuit 350 sets the firm-up failure information to the lens information and transmits the lens information (S1005). On the other hand, if the failure condition is cleared, the lens system control circuit 350 transmits the lens information without change thereof (S1005).

The lens system control circuit 350 verifies reception of a firm-up request through communication from the system control circuit 50 (S1006). If the request is received, the lens system control circuit 350 proceeds to a process of step S1007. On the other hand, if the request is not received, the lens system control circuit 350 waits for the reception of the firm-up request in step S1006 again. The lens system control circuit 350 then sets the failure condition to the firm-up failure information (S1007). The firm-up failure information here is set until the firm-up is completed (see S1014 described later). The lens system control circuit 350 receives, line by line, the data of the firm-up file selected by the user operation on the list screen 840 of FIG. 7 (S1008). The format of the firm-up file can be an S format or a HEX format generally used as firmware. However, the present invention does not depend on the format of the firm-up file. The format of the firm-up file is the S format in the description of FIG. 9.

In step S1009, the lens system control circuit 350 determines whether the received data indicates a start record (S1009). If the data indicates the start record, the lens system control circuit 350 proceeds to step S1008 and receives data of the next line. On the other hand, if the data does not indicate the start record, the lens system control circuit 350 determines whether the data indicates a data record (S1010) and proceeds to step S1011 if the data indicates the data record. On the other hand, if the data does not indicate the data record, the lens system control circuit 350 proceeds to step S1013.

In step S1011, the lens system control circuit 350 compares the check sum of the received data record with the check sum obtained from the data values from the byte count to the check sum. The lens system control circuit 350 proceeds to step S1008 if the check sums match, and receives data of the next line. On the other hand, the lens system control circuit 350 proceeds to step S1012 if the check sums do not match, and shifts the lens apparatus 300 to the safe mode. The firm-up processing is terminated abnormally.

In step S1013, the lens system control circuit 350 determines whether the received data indicates the end record and proceeds to step S1014 if the data indicates the end record. The lens system control circuit 350 clears the failure condition of the firm-up failure information set in step S1007 and normally terminates the firm-up processing.

Although all files are displayed in the firm-up file list for the mounted lens apparatus in the process of the embodiment, the number of display files may be able to be designated, and up to a predetermined number of files may be displayed. A screen for confirming whether to perform the firm-up based on the file with the latest creation date/time may be displayed, without displaying the list. Only the operation of the power switch 72 is enabled in the camera error processing of S513, S613, and S703. However, the range of prohibiting the operation may be changed such as by enabling only a setting operation which does not use the lens apparatus such as a reproduction operation (i.e. operation that does not move the apparatus as a camera or an operation not involving the lens control). The firm-up of the lens apparatus may also be performed in the camera error processing of S513, S613, and S703. The warning screen 870 of FIG. 7 may be displayed to prompt the user for the update again when the power supply source is input again upon the attachment of the lens apparatus which fails in the firm-up or when the lens is mounted again.

For the processes of the embodiment, a storage medium recording program codes of software realizing the functions may be provided to a system or an apparatus. A computer (or a CPU or an MPU) of the system or the apparatus can read out and execute the program codes stored in the storage medium to realize the functions of the embodiment. In this case, the program codes read out from the storage medium realize the functions of the embodiment, and the present invention includes the storage medium storing the program codes. Examples of the storage medium for supplying the program codes include a floppy (registered trademark) disk, a hard disk, an optical disk, and a magneto-optical disk. A CD-ROM, a CD-R, a magnetic tape, a non-volatile memory card, and a ROM can also be used. The execution of the program codes read out by the computer realizes not only the functions of the embodiment. The present invention also includes a case in which an OS (operating system) operating on the computer executes part or all of the actual processes based on instructions of the program codes to realize the functions of the embodiment through the processes. The program codes read out from the storage medium may be written in a memory included in a function expansion board inserted to the computer or in a function expansion unit connected to the computer. The present invention also includes a case in which a CPU included in the function expansion board or the function expansion unit executes part or all of the actual processes based on the instructions of the programs codes to realize the functions of the embodiment through the processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-102457, filed Apr. 28, 2011, and Japanese Patent Application No. 2012-080013, filed Mar. 30, 2012 which are hereby incorporated by reference herein in their entirety.

What is claimed is:

1. An image pickup apparatus which is mountable to a lens apparatus thereon, comprising:
    a lens information obtaining unit that obtains information of a mounted lens apparatus; and
    a control unit that if the lens apparatus is identified, based on the obtained information, as the lens apparatus which fails in firmware update, controls to restrict an operation in which the lens apparatus is used and enable an operation which does not use the lens apparatus.

2. The image pickup apparatus according to claim 1, wherein
    if the mounted lens apparatus is a lens apparatus which fails in the firmware update, the control unit controls to enable an operation of the firmware update of the lens apparatus and an operation of turning off a power supply source of the image pickup apparatus and restrict the operation in which the lens apparatus is used.

3. The image pickup apparatus according to claim 1, wherein
    if the firmware update of the mounted lens apparatus is terminated by a failure, the control unit controls to enable the operation of turning off the power supply source of the image pickup apparatus and restrict the operation in which the lens apparatus is used.

4. The image pickup apparatus according to claim 1, wherein
    if the control unit obtains the information of the mounted lens apparatus upon activation of the image pickup apparatus and the obtained information indicates that the lens apparatus is a lens apparatus which fails in the firmware update, the control unit controls to enable the operation of the firmware update of the lens apparatus and restrict the operation in which the lens apparatus is used.

5. The image pickup apparatus according to claim 1, wherein
the control unit controls to enable the operation of turning off the power supply source of the image pickup apparatus and restrict the operation in which the lens apparatus is used, if a remaining battery capacity is short.

6. The image pickup apparatus according to claim 1, wherein
the control unit controls to enable the operation of turning off the power supply source of the image pickup apparatus and restrict the operation in which the lens apparatus is used, if a firm-up file of the mounted lens apparatus does not exist.

7. A lens apparatus mountable on an image pickup apparatus, comprising:
a memory that holds control firmware; and
a control unit that is arranged to perform firmware update of rewriting the firmware or adding firmware on the basis of an instruction from the image pickup apparatus,
wherein if the power supply from the image pickup apparatus is cut off before completion of the firmware update, the control unit transmits non-completion information of the firmware update according to next power supply from the image pickup apparatus.

8. The lens apparatus according to claim 7, wherein
the control unit performs the firmware update on the basis of data transmitted after the transmission of the non-completion information of the firmware update.

9. A control method of an image pickup apparatus which is mountable to a lens apparatus thereon, the control method comprising:
obtaining information of a mounted lens apparatus; and
controlling to restrict an operation in which an lens apparatus is used and enable an operation which does not use the lens apparatus, if the lens apparatus is identified, based on the obtained information, as the lens apparatus which fails in firmware update.

10. A control method of a lens apparatus that comprises a memory for holding control firmware and that is mountable on an image pickup apparatus, the control method comprising
a control step capable of performing firmware update of rewriting the firmware or adding firmware on the basis of an instruction from the image pickup apparatus, wherein if the power supply from the image pickup apparatus is cut off before completion of the firmware update, the control step transmits non-completion information of the firmware update according to next power supply from the image pickup apparatus.

11. A non-transitory computer readable recording medium storing thereon a program comprising a program code for causing a computer to execute the control method according to claim 9.

12. A non-transitory computer readable recording medium storing thereon a program comprising a program code for causing a computer to execute the control method according to claim 10.

13. An image pickup apparatus which is mountable to a lens apparatus thereon, comprising:
a lens information obtaining unit that obtains information of a mounted lens apparatus; and
a control unit that if the lens apparatus is identified, based on the obtained information, as a mounted lens apparatus which fails in firmware update, restricts an operation in which the mounted lens apparatus is used and enables an operation which does not use the mounted lens apparatus.

14. The image pickup apparatus according to claim 13, wherein
if the mounted lens apparatus is a mounted lens apparatus which fails in the firmware update, the control unit enables an operation of the firmware update of the mounted lens apparatus and an operation of turning off a power supply source of the image pickup apparatus and restricts the operation in which the mounted lens apparatus is used.

15. The image pickup apparatus according to claim 13, wherein
if the firmware update of the mounted lens apparatus is terminated by a failure, the control unit enables the operation of turning off the power supply source of the image pickup apparatus and restricts the operation in which the mounted lens apparatus is used.

16. The image pickup apparatus according to claim 13, wherein
if the control unit obtains the information of the mounted lens apparatus upon activation of the image pickup apparatus and the obtained information indicates that the mounted lens apparatus is a mounted lens apparatus which fails in the firmware update, the control unit enables the operation of the firmware update of the interchangeable lens and restricts the operation in which the mounted lens apparatus is used.

17. The image pickup apparatus according to claim 13, wherein
the control unit enables the operation of turning off the power supply source of the image pickup apparatus and restricts the operation in which the mounted lens apparatus is used, if a remaining battery capacity is short.

18. The image pickup apparatus according to claim 13, wherein
the control unit enables the operation of turning off the power supply source of the image pickup apparatus and restricts the operation in which the mounted lens apparatus is used, if a firm-up file of the mounted lens apparatus does not exist.

19. A lens apparatus mountable on an image pickup apparatus, comprising:
a memory that holds control firmware; and
a control unit that is arranged to perform firmware update of rewriting the firmware or adding firmware on the basis of an instruction from the image pickup apparatus,
wherein if the power supply from the image pickup apparatus is cut off before completion of the firmware update, the control unit transmits information which is indicating non-completion of the firmware update in a case that power is supplied next.

20. The lens apparatus according to claim 19, wherein
the control unit performs the firmware update on the basis of data transmitted after the transmission of the non-completion information of the firmware update.

21. The lens apparatus according to claim 19, wherein
if the power supply from the image pickup apparatus is cut off before completion of the firmware update, the control unit stores information which is indicating non-completion of the firmware update.

22. The lens apparatus according to claim 19, wherein
if the power supply from the image pickup apparatus is cut off before completion of the firmware update, the control unit transmits the information to the mounted image pickup apparatus.

23. The lens apparatus according to claim 19, wherein
the control unit transmits information which is indicating non-completion of the firmware update in a case that power is supplied from the mounted image pickup apparatus next.

24. A control method of an image pickup apparatus which is mountable to a lens apparatus thereon, the control method comprising:

obtaining information of a mounted lens apparatus; and restricting an operation in which the mounted lens apparatus is used and enabling an operation which does not use the mounted lens apparatus, if the mounted lens apparatus is identified, based on the obtained information, as the mounted lens apparatus which fails in firmware update.

25. A control method of a lens apparatus that comprises a memory for holding control firmware and that is mountable on an image pickup apparatus, the control method comprising a control step capable of performing firmware update of rewriting the firmware or adding firmware on the basis of an instruction from the image pickup apparatus, wherein if the power supply from the image pickup apparatus is cut off before completion of the firmware update, the control step transmits information which is indicating non-completion of the firmware update in a case that next power is supplied from an image pickup apparatus.

26. A non-transitory computer readable recording medium storing thereon a program comprising a program code for causing a computer to execute the control method according to claim 24.

27. A non-transitory computer readable recording medium storing thereon a program comprising a program code for causing a computer to execute the control method according to claim 25.

* * * * *